United States Patent [19]

Gudbrandsen et al.

[11] Patent Number: 4,643,098

[45] Date of Patent: Feb. 17, 1987

[54] ROCKET WITH TRACER CHARGE AND GUNPOWDER RODS

[75] Inventors: Gunnar F. Gudbrandsen, Raufoss; Per kristian Skjerven, Trevatn; Bjorn S. Bjerkvoll, Raufoss, all of Norway

[73] Assignee: A/S Raufoss Ammunisjonsfabrikker, Raufoss, Norway

[21] Appl. No.: 662,023

[22] Filed: Oct. 18, 1984

[30] Foreign Application Priority Data

Oct. 20, 1983 [NO] Norway .................. 833817

[51] Int. Cl.⁴ ............................. F42B 13/36
[52] U.S. Cl. .................. 102/513; 102/374; 102/352
[58] Field of Search ............ 102/374, 513, 352

[56] References Cited

U.S. PATENT DOCUMENTS

| | | | |
|---|---|---|---|
| 2,206,809 | 7/1940 | Denoix | 102/374 X |
| 2,460,289 | 2/1949 | Hickman | 102/374 X |
| 2,462,099 | 2/1949 | Hickman | 102/374 X |
| 3,374,741 | 3/1968 | Bass | 102/513 |
| 3,731,628 | 5/1973 | Fink | 102/374 |
| 3,853,058 | 12/1974 | Tartault et al. | 102/374 |
| 3,940,605 | 2/1976 | Gerber | 102/513 X |
| 4,227,460 | 10/1980 | Krone et al. | 102/513 X |

*Primary Examiner*—Peter A. Nelson
*Attorney, Agent, or Firm*—Watson, Cole, Grindle & Watson

[57] ABSTRACT

A practice rocket for antitank weapons comprising a head and a support rod fastened to the head, the support rod carrying a tracer charge at its rearward end, and a propulsive charge in the form of gunpowder rods distributed around the support rod. The gunpowder rods are fastened to the head or to a disc attached to the head, and the support rod and the gunpowder rods are surrounded by a sleeve having a cylindrical portion and a narrow portion constituting a nozzle. The tracer charge is situated in front of the nozzle, and is ignited simultaneously with the firing of the rocket.

8 Claims, 2 Drawing Figures

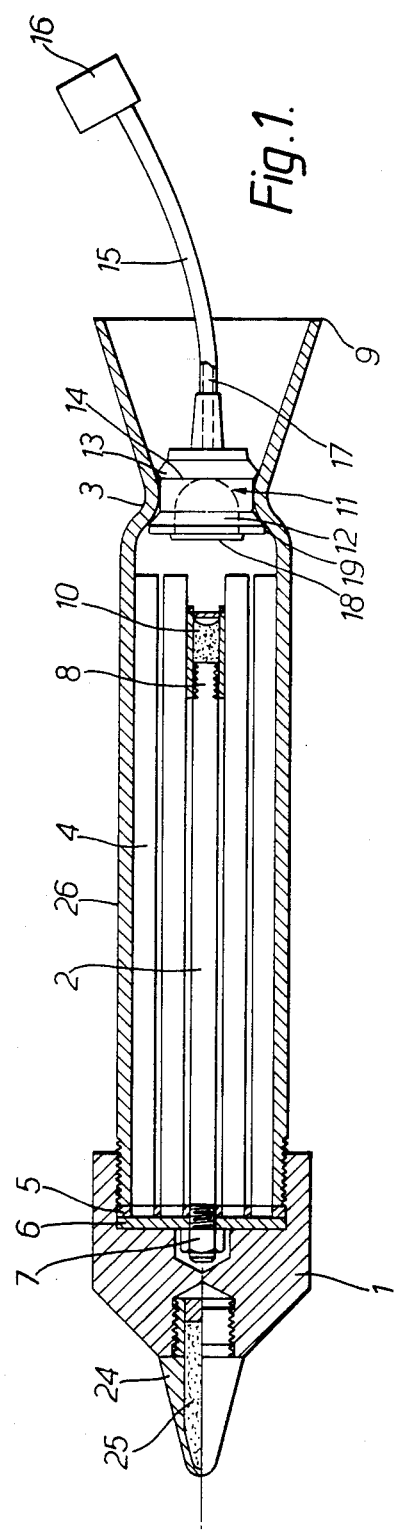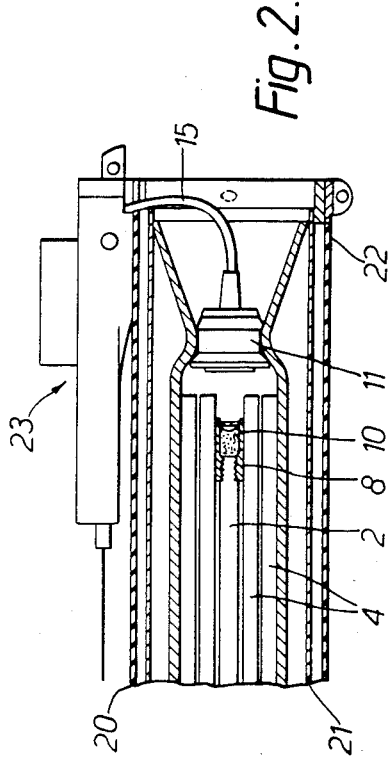

ROCKET WITH TRACER CHARGE AND GUNPOWDER RODS

BACKGROUND OF THE INVENTION

1. Field of the Invention

The present invention relates to a rocket, and in particular, but not exclusively, to a practice rocket for antitank weapons and the like.

2. The Prior Art

A prior art rocket of the noted type comprises a projectile having a head made of steel or another material, and a rod which projects rearwardly from the head and which carries a nozzle at its rearmost end. A propulsive charge in the form of rods of gunpowder are situated around the rod extending in parallel therewith, and the gunpowder rods are fastened to the head or to a disc which is attached to the head. A tracer charge is situated in a cap at the rearmost end of the rod. If a rocket of this prior art type hits the ground or a target while the tracer charge is still burning, there is a great danger of causing a fire in the target area because the tracer charge is exposed, i.e., the burning surface of the tracer charge may ignite a possible inflammable material in the target area.

A prior art solution of this problem consists of placing the tracer charge inside of a sleeve, which also comprises a nozzle for the propulsive gas. In the prior art rocket rods of gunpowder are situated inside the sleeve, supported by a perforated disc adjacent the nozzle. This disc also carries a cap which contains the tracer charge. Rearwardly of the charge is an igniter charge which is adapted to ignite the rearmost end of the tracer charge. In order to prevent the tracer charge from becoming ignited directly by the gunpowder rods when these are burning, the cap is provided with a layer of heat-insulating material on its inner surface. A major disadvantage of this prior art rocket is that the perforated disc acts to narrow or throttle the flow path of the gases which are developed when the gunpowder rods are burning, and the efficiency of the gunpowder is reduced. Another disadvantage is that, when the gunpowder rods are weakened because material of the rods is burnt up, the rods have reduced ability of being supported by the perforated disc. In this connection, it should be kept in mind that the burning takes place while the rocket is accellerating, and the gunpowder rods are subjected to large inertia forces which must be transferred to the perforated disc in order to prevent the rods from moving rearwardly relative to the remaining parts of the rocket. When the rods are weakened while they burn, it may occur that the rods are no longer able to transfer the inertia forces to the perforated disc, and the rods may break and move against the disc. This will influence the combustion and cause a still reduced efficiency of the gunpowder.

SUMMARY OF THE INVENTION

The present invention relates to a rocket in which the above-mentioned problems are avoided. According to the invention the rocket comprises a head and a metal support rod which protrudes rearwardly from the head. The metal support rod is surrounded by a sleeve, which comprises a nozzle in its rearward end and contains gunpowder rods. A tracer charge is situated in a cap on the rearward end of the metal support rod. Thus, the cap is carried merely by the metal support rod. The gunpowder rods are fastened to the head or to a disc attached thereto.

In the present invention no perforated disc is necessary in order to support the gunpowder rods, and the absence of this disc means that the flow of gases from the burning gunpowder rods is entirely undisturbed until it reaches the nozzle. Another advantage is that the length of the metal support rod can be chosen freely within the space between the head and the nozzle, and the tracer charge can be situated at the most suitable place along the length of the sleeve. It is also possible to vary the amount of the tracer charge within wide limits.

The tracer charge can be situated in a recess in the metal support rod itself, or in a cap which is fastened to the metal rod.

The invention will be explained more detailed hereinafter, by means of a preferred embodiment shown in the attached drawing.

DESCRIPTION OF THE DRAWINGS

In the drawing,

FIG. 1 is a side view of a rocket according to the invention, shown in a longitudinal section.

FIG. 2 is a side view, shown in a longitudinal section, of the rearmost part of a rocket according to the invention, mounted in a launcher, in which a tube having a less diameter than the tube of the launcher is inserted, the diameter of the inserted tube being adapted to the diameter of a practice rocket.

DETAILED DESCRIPTION OF THE PREFERRED EMBODIMENT

The drawing shows a rocket head 1, which may be made of steel or another suitable material and may have a marking charge 25 in its forward end, and a rearwardly extending sleeve 26 of aluminum or another suitable material is fastened to the sleeve and has a nozzle 3 at its rearward end. The propulsive charge is situated between the head 1 and the nozzle 3, and consists of gunpowder rods 4 which are evenly distributed around the support rod 2 and are fastened to the head 1 or to a disc 5 adjacent the head. The sleeve 26 constitutes the tube of the rocket motor.

The forward end of the rod 2 is fastened to a disc 6 by means of a nut 7, and to the rearward end of the support rod 2 is fastened a cap 8 by means of threads. A tracer charge 10 is situated in a recess in the rearward end of the cap.

The rearmost edge 9 of the nozzle has such a diameter that it acts to guide the rocket in the launching tube 21. A plastic cap 11 is situated in the narrowest part of the nozzle aperture, and this cap is fastened by means of two collars 13 and 19 of larger diameter than the narrowest part of the nozzle aperture. The cap 11 is sufficiently resilient to be pressed into the aperture. A cavity 12 in the cap 11 is open forwardly, and the rearward end of the cavity may have the shape of a hemisphere. The cavity communicates with a part 16 containing an ignition fuse through a hose 15 the part 16 being adapted to be inserted in the ignition mechanism of the rocket launcher. The cavity 12 and the hose 15 are filled with gunpowder 17, and a thin precussion disc 18 closes the forward end of the cavity 12.

The thin disc 18 is only provided in order to protect the gunpowder 17 prior to the use of the rocket, and will burst upon ignition.

FIG. 2 shows the rearward part of a rocket launcher 20, in which is inserted a practice tube 21 of reduced diameter, adapted to the rocket described above. The rearward end of the tube 21 has threads, and is screwed into an adapter ring 22 fastened in the rearward end of the launcher.

The complete rocket, including the igniter cap 11, can be inserted in the inner tube 21 in the launcher, whereupon the part 16 containing the ignition fuse is inserted in the ignition mechanism 23 of the launcher 20.

During the firing the igniter cap 11 will serve to resist the forces created by the pressure caused in the sleeve 26, whereupon the cap is pushed out of the nozzle aperture.

In order that the user of the rocket may observe where the rocket hits, the rocket head may include a marking charge 25 situated in a cap 24 of a suitable material, for instance aluminum. When the rocket hits a target the marking charge will ignite by the impact and produce a gleam of light and/or smoke which indicates the point of impact.

In order to fasten the discs 5 and 6 to the head 1 the two discs may be inserted in a bore in the head 1, and the sleeve 26 may be screwed into the bore, as shown in FIG. 1.

We claim:

1. A rocket which can be launched from a rocket launcher, said rocket comprising
   a head element,
   a hollow sleeve which extends away from said head element, said hollow sleeve having a tubular portion which defines an interior space and a nozzle portion,
   a support rod located within said interior space, said support rod having a first end facing said head and a second end facing said nozzle portion of said hollow sleeve,
   a tracer charge mounted on said rod, and
   a plurality of gunpowder rods positioned within said interior space and around said central rod, each of said gunpowder rods including a first end facing said head and a second end facing said nozzle portion of said hollow sleeve.

2. A rocket as defined in claim 1, wherein said tracer charge is located within said rod.

3. A rocket as defined in claim 1, wherein said head element includes a threaded bore therein and wherein said tubular portion of said hollow sleeve includes a threaded end opposite said nozzle portion which can engage with the threaded bore in said head element.

4. A rocket as defined in claim 3, including a disc located in said threaded bore in said head element, and wherein the first end of said support rod is attached to said disc.

5. A rocket as defined in claim 4, wherein the first ends of said gunpowder rods are attached to said disc.

6. A rocket as defined in claim 1, including a percussion disc fitted into said nozzle portion of said hollow sleeve.

7. A rocket as defined in claim 6, including an ignition fuze and a hose connecting said ignition fuze to said percussion disc.

8. A rocket as defined in claim 1, including a marking charge attached to said head element.

* * * * *